United States Patent
Aoki et al.

(10) Patent No.: US 9,420,134 B2
(45) Date of Patent: Aug. 16, 2016

(54) IMAGE FORMING APPARATUS HAVING A CONTROL UNIT TO CONTROL AND MOVE A READ UNIT

(71) Applicant: CANON KABUSHIKI KAISHA, Tokyo (JP)

(72) Inventors: Masaru Aoki, Numazu (JP); Yuki Nakajima, Numazu (JP); Hiroshi Kato, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/864,073

(22) Filed: Apr. 16, 2013

(65) Prior Publication Data
US 2013/0293907 A1    Nov. 7, 2013

(30) Foreign Application Priority Data
May 7, 2012    (JP) ................. 2012-106110

(51) Int. Cl.
*H04N 1/00* (2006.01)
*G06K 15/16* (2006.01)
*G03G 15/23* (2006.01)
*G03G 15/00* (2006.01)

(52) U.S. Cl.
CPC ......... *H04N 1/00572* (2013.01); *G03G 15/234* (2013.01); *G03G 15/60* (2013.01); *G06K 15/16* (2013.01); *G03G 2215/00358* (2013.01)

(58) Field of Classification Search
CPC ............ H04N 1/00567; H04N 1/0057; H04N 1/00572; H04N 1/00575; H04N 1/00578; H04N 1/00591; H04N 1/00594; H04N 1/00596; G06K 15/16; G06G 15/234; G06G 15/60; G06G 2215/00358
USPC .......... 358/1.1, 1.12, 400, 401, 496, 498, 296
See application file for complete search history.

(56) References Cited

U.S. PATENT DOCUMENTS

| | | | | |
|---|---|---|---|---|
| 5,055,946 A | * | 10/1991 | Kurahashi et al. | ............ 358/498 |
| 7,414,764 B2 | | 8/2008 | Shyu | |
| 7,791,771 B2 | | 9/2010 | Shiraishi | |
| 7,847,982 B2 | | 12/2010 | Mizumukai | |
| 7,924,481 B2 | | 4/2011 | Kim | |
| 8,072,653 B2 | * | 12/2011 | Iwata et al. | .................... 358/474 |

(Continued)

FOREIGN PATENT DOCUMENTS

| | | |
|---|---|---|
| CN | 1361451 A | 7/2002 |
| CN | 1509891 A | 7/2004 |

(Continued)

OTHER PUBLICATIONS

Office Action issued Mar. 30, 2015 in related CN Application No. 201310163030.X.

*Primary Examiner* — Thomas D Lee
(74) *Attorney, Agent, or Firm* — Canon USA Inc. IP Division

(57) ABSTRACT

The image forming apparatus includes an image forming unit for forming an image on a recording material; an original read unit for reading an original at a read position facing a conveyance path in which the recording material and the original are to be conveyed selectively, and a control unit for switching a position of the original read unit to a position different from the read position during a period in which the recording material is being conveyed along the conveyance path.

12 Claims, 11 Drawing Sheets

(56) References Cited

U.S. PATENT DOCUMENTS

| | | | |
|---|---|---|---|
| 8,218,158 B2* | 7/2012 | Kawazoe et al. | 358/1.12 |
| 8,970,928 B2* | 3/2015 | Arakawa | 358/498 |
| 2008/0158620 A1 | 7/2008 | Iwata et al. | |
| 2008/0266622 A1 | 10/2008 | Kawazoe et al. | |
| 2014/0045685 A1 | 2/2014 | Iguchi et al. | |

FOREIGN PATENT DOCUMENTS

| | | |
|---|---|---|
| JP | 6-164818 | 6/1994 |
| JP | 2000-185881 | 7/2000 |
| JP | 2004-180146 | 6/2004 |
| JP | 2006-232467 | 9/2006 |
| JP | 2008-182686 A | 8/2008 |

\* cited by examiner

IMAGE FORMING APPARATUS HAVING A CONTROL UNIT TO CONTROL AND MOVE A READ UNIT

BACKGROUND OF THE INVENTION

1. Field of the Invention

The present invention relates to an image forming apparatus, such as a copying machine, a laser beam printer (hereinafter referred to as "LBP"), and a facsimile machine, which includes an original read apparatus as typified by an automatic document feeder (hereinafter referred to as "ADF") unit.

2. Description of the Related Art

Conventionally, in this type of image forming apparatus, an original conveyance path of the original read apparatus and a recording material conveyance path of an image forming unit are provided independently of each other. Specifically, a sheet feeding unit for an original or a recording material, a guide member serving as a predetermined conveyance path, multiple conveyance rollers, a drive force transmission unit for the conveyance rollers, a motor serving as a drive source, a driving circuit of the motor, a sheet discharging unit, and other components are arranged in each of the original conveyance path and the recording material conveyance path.

Such arrangement inevitably leads to complication of the overall mechanism configuration of the image forming apparatus and increase in cost and size thereof. To solve those problems, for example, Japanese Patent Application Laid-Open No. 2006-232467 discloses an original read unit arranged in a double-sided conveyance path of the recording material, which extends from the sheet feeding unit to the sheet discharging unit, to thereby use one common path for both the original conveyance system and the recording material conveyance system. Thus, a simple configuration and reduction in cost and size of the image forming apparatus are attained.

In the image forming apparatus disclosed in Japanese Patent Application Laid-Open No. 2006-232467, however, the original read unit is arranged in the double-sided conveyance path of the recording material, and hence, when the original is present in the double-sided conveyance path, the double-sided print operation cannot be executed. Therefore, during the original read operation, the print operation needs to be stopped, and as a result, the productivity decreases when printing an image of the original that has undergone the read operation. Further, a recording material as well as the original passes across an original read surface of the original read unit, and hence the original read surface is liable to be blotted. Still further, a time period to correct a white reference value of the original read unit is limited. As a result, stable print performance cannot be obtained.

SUMMARY OF THE INVENTION

In view of the above-mentioned circumstances, a purpose of the present invention is to provide an image forming apparatus capable of improving productivity when printing an image of an original that has undergone a read operation, and obtaining stable print performance.

Another purpose of the present invention is to provide an image forming apparatus including an image forming unit for forming an image on a recording material, a conveyance path in which a recording material and an original are to be conveyed selectively, an original read unit for reading an original at a read position facing the conveyance path, and a control unit for controlling the read position of the original read unit, wherein during a period in which the recording material is being conveyed along the conveyance path, the control unit switches a position of the original read unit to a position different from the read position.

Further features of the present invention will become apparent from the following description of exemplary embodiments with reference to the attached drawings.

DESCRIPTION OF THE EMBODIMENTS

Exemplary embodiments of the present invention are described below.

First Embodiment

Image Forming Apparatus

Figure 1A:
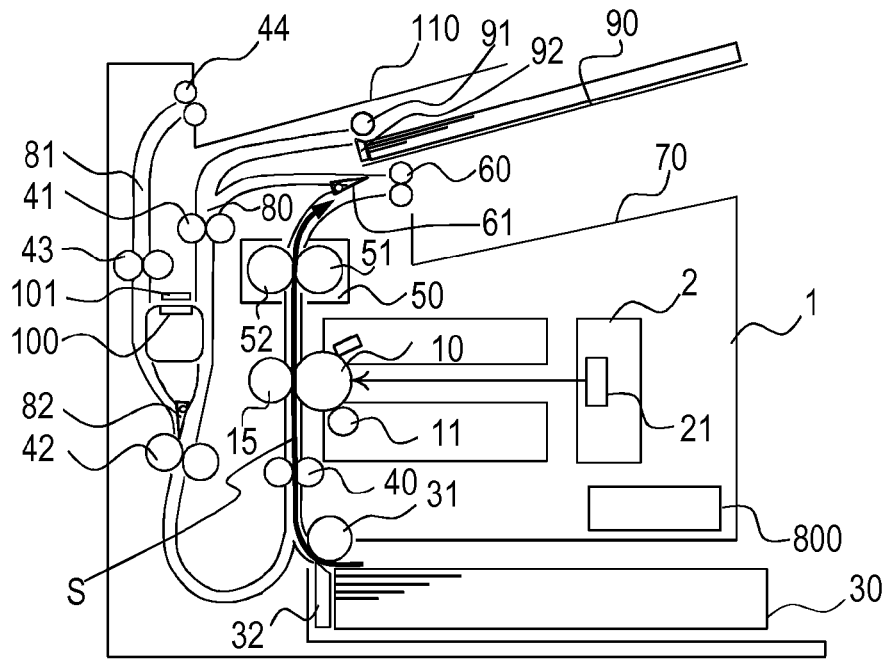
FIG. 1A is a diagram illustrating a configuration of an image forming apparatus according to a first embodiment of the present invention.

FIG. 1A is a schematic diagram of an image forming apparatus 1 according to a first embodiment of the present invention. The image forming apparatus 1 includes, at the center thereof, a rotatable photosensitive drum 10 serving as an image bearing member, and a developing roller 11 provided to be along and come contact with the photosensitive drum 10 and configured to rotate while carrying toner on the developing roller 11. When a print signal is received, a light emitting section 21 of an optical unit 2 irradiates a surface of the rotating photosensitive drum 10 with laser light. An electrostatic latent image is formed on the surface of the photosensitive drum 10 that is irradiated with the laser light. When the toner carried on the rotating developing roller 11 is fed to the electrostatic latent image on the surface of the photosensitive drum 10, a toner image is formed on the surface of the photosensitive drum 10.

On the other hand, recording materials S received in a first sheet feeding unit 30 are conveyed one by one to a conveyance roller pair 40 by a cassette (hereinafter referred to as "CST") pickup roller 31 and a separation device 32. The conveyance roller pair 40 conveys each of the recording materials S to a transfer roller 15 while synchronizing the toner image on the surface of the photosensitive drum 10 with the position of the leading edge of the recording material S. The toner image is transferred onto the recording material S due to a bias and pressure applied to the transfer roller 15. Further, the transfer roller 15 conveys the recording material S to a fixing unit 50. The fixing unit 50 fixes the toner image to the recording material S due to heat from a rotatable heating roller 51 and pressure of a rotatable pressure roller 52 opposed to the heating roller 51. The recording material S having the toner image fixed thereto is conveyed to a discharge roller pair 60. In a case of a single-sided print operation, the discharge roller pair 60 conveys the recording material S directly outside the image forming apparatus 1, and the recording material S is stacked on a first sheet discharging unit 70. Further, the image forming apparatus 1 is controlled by a control unit 800 to be described with reference to FIG. 2A.

Figure 1B:
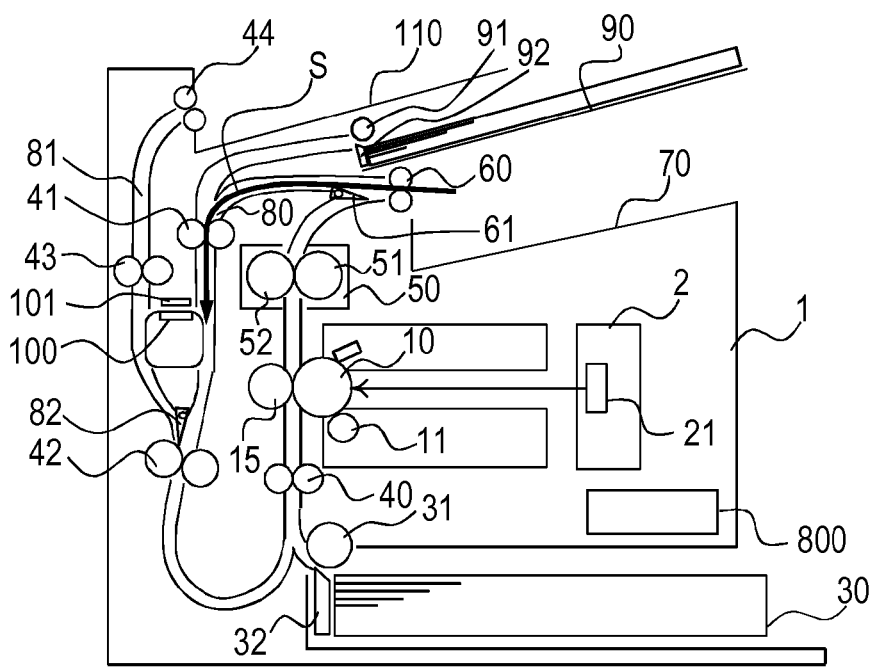
FIG. 1B is an explanatory diagram illustrating a print process of the image forming apparatus according to the first embodiment.

FIG. 1B is an explanatory diagram illustrating a double-sided print process. A double-sided flapper 61 switches the conveyance path after the passage of the trailing edge of the recording material S. After that, the discharge roller pair 60 rotates in a reverse direction to convey the recording material S to a double-sided conveyance path 80 (first conveyance path). Note that, an original G and the recording material S are selectively conveyed to the double-sided conveyance path 80. The recording material S thus switched back is conveyed to an original read unit 100 via a conveyance roller pair 41. Note that, the original read unit 100 is configured to read front and back surfaces of the original G. After that, the recording material S is conveyed to a conveyance roller pair 42 and the conveyance roller pair 40, and conveyed again to the transfer roller 15. Then, a toner image is transferred and fixed to the recording material S, and the recording material S is stacked on the first sheet discharging unit 70.

(Configuration of Control Unit)

Figure 2A:
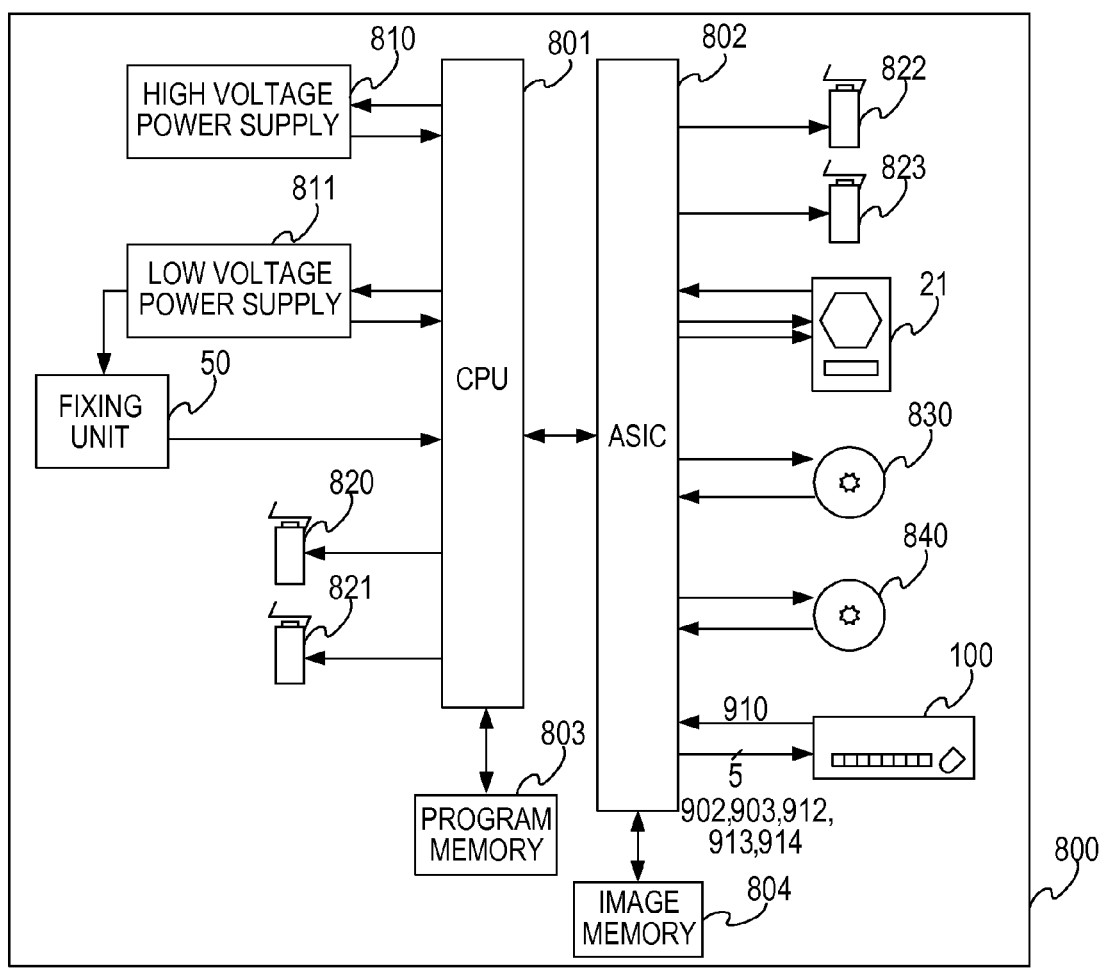
FIG. 2A is a diagram illustrating a control unit of the image forming apparatus according to the first embodiment.

FIG. 2A is a block diagram of the control unit 800 of the image forming apparatus 1, which includes a control CPU 801. Referring to FIG. 2A, operations of the control CPU 801 and an application-specific integrated circuit (ASIC) 802 in the image forming operation of this embodiment are described. The control CPU 801 is connected, via the ASIC 802, to the light emitting section 21 including a polygon mirror, a motor, and a laser light emitting element. In order to form a desired electrostatic latent image by scanning the photosensitive drum 10 with laser light, the control CPU 801 outputs a control signal to the ASIC 802 so as to control the light emitting section 21. Similarly, in order to convey the recording material S, the control CPU 801 controls a main motor 830 for driving the CST pickup roller 31, the conveyance roller pair 40, the photosensitive drum 10, the transfer roller 15, the heating roller 51, and the pressure roller 52. Further, the control CPU 801 controls a CST sheet feeding solenoid 822, which is turned ON at the start of the sheet feeding operation so as to drive the CST pickup roller 31, and a double-sided drive motor 840 for driving an original pickup roller 91 and the conveyance roller pairs 41 to 44.

Further, the control CPU 801 controls a high voltage power supply 810 for controlling primary charging, developing, and transfer biases that are necessary for the electrophotographic process, and also controls the fixing unit 50 and a low voltage power supply 811. The control CPU 801 monitors temperature through use of a thermistor (not shown) provided to the fixing unit 50 so as to control fixing temperature to be maintained at a constant value. The control CPU 801 is connected to a program memory 803 via a bus (not shown) or the like, and programs and data for executing all or part of the above-mentioned control and processing to be performed by the control CPU 801 are stored in the program memory 803. In other words, the control CPU 801 executes each control by using the programs and data stored in the program memory 803.

The ASIC 802 controls the speed of the motor inside the light emitting section 21, the speed of the main motor 830, and the speed of the double-sided drive motor 840 based on commands issued from the control CPU 801. The speed control for each motor is performed by detecting tack signals (pulse signals output from the motor every time the motor is rotated) from the motor (not shown) and outputting an acceleration or deceleration signal to the motor so as to set the intervals of the tack signals to predetermined time intervals. It is therefore preferred that the control circuit be formed as a hardware circuit using the ASIC 802 because the control load on the control CPU 801 is reduced.

When the control CPU 801 receives a print command issued from a host computer (not shown), the control CPU 801 drives the main motor 830, the double-sided drive motor 840, and the CST sheet feeding solenoid 822 to convey the recording material S. When a toner image formed on the surface of the photosensitive drum 10 is transferred onto the recording material S by the transfer roller 15 and then fixed to the recording material S by the fixing unit 50, the recording material S is discharged by the discharge roller pair 60 onto the first sheet discharging unit 70 serving as a recording material stacking unit. In order to enhance alignment performance for the recording material S having the image formed thereon, there is provided a slope gently rising in a recording material discharging direction from the vicinity of a discharge port of the first sheet discharging unit 70. The control CPU 801 controls a predetermined electric power to be supplied to the fixing unit 50 via the low voltage power supply 811 so as to generate a predetermined amount of heat which is supplied to the recording material S, thereby fusing and fixing the toner image on the recording material S.

Next, an original read operation of this embodiment is described. When the control CPU 801 receives a scan command issued from the host computer, the control CPU 801 drives a double-sided flapper solenoid 820, the double-sided drive motor 840, and an original feeding solenoid 823. Through the drive of the original feeding solenoid 823, torque of the double-sided drive motor 840 is transmitted to the original pickup roller 91 so that the original G is conveyed. Various control signals described later, such as a CISLED signal 903, a CISSTART signal 902, an SYSCLK signal 914, an Sl_in signal 912, and an Sl_select signal 913, are input from the ASIC 802 to the original read unit 100. The original read unit 100 outputs an Sl_out signal 910 to the ASIC 802. The control CPU 801 stores, in an image memory 804 connected to the ASIC 802, an image read by the original read unit 100 through various kinds of control via the ASIC 802. After that, the control CPU 801 operates a switchback solenoid 821 to tilt a switchback flapper 82 toward a side on which the original G is guided to an original-dedicated conveyance path 81 (second conveyance path), and rotates the double-sided drive motor 840 in a reverse direction to convey the original G to a second sheet discharging unit 110.

(Overview of Original Read Unit)

Figure 2B:
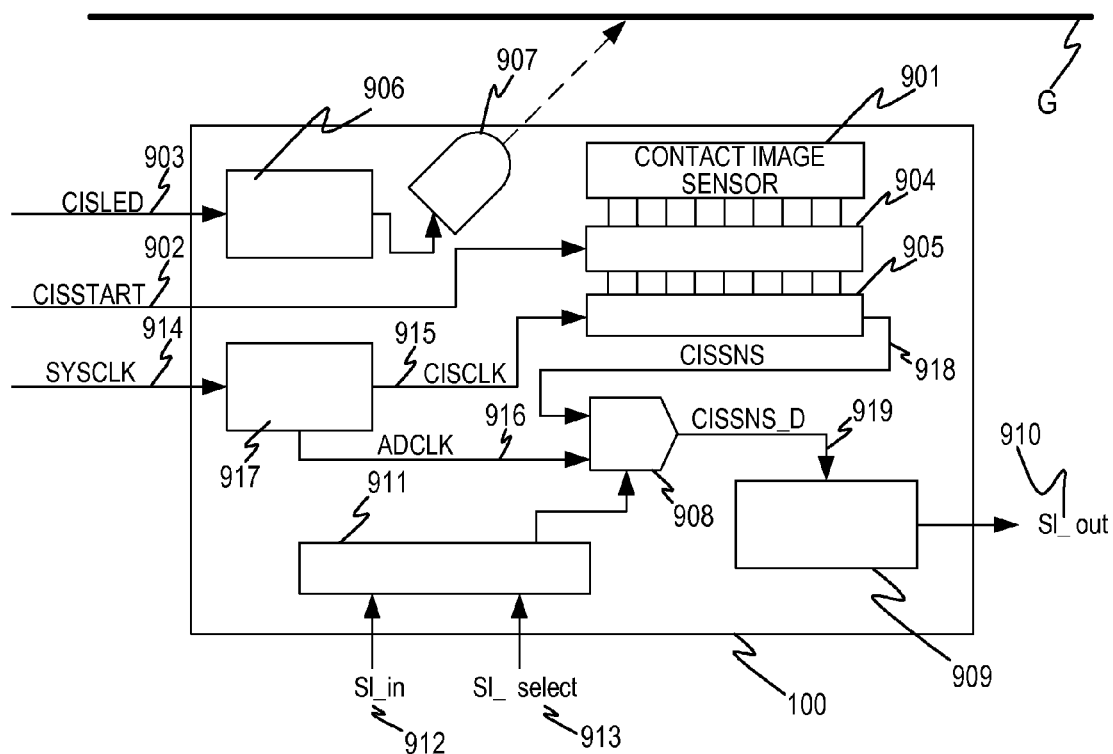
FIG. 2B is an explanatory diagram illustrating a configuration of an original read unit of the image forming apparatus according to the first embodiment.

Next, details of the original read unit 100 are described with reference to FIG. 2B. FIG. 2B is a block diagram illustrating a circuit of the original read unit 100. In FIG. 2B, a contact image sensor (CIS) section 901 includes, for example, photodiodes arrayed for 10,368 pixels with a specific main scanning density (for example, 1,200 dpi). The CISSTART signal 902 is input to the CIS as a start pulse signal for the original read operation, and the CISLED signal 903 is a control signal for controlling a light emitting element 907. A current amplifying section 906 controls a current to be supplied to the light emitting element 907 based on the CISLED signal 903, and the light emitting element 907 irradiates the original G uniformly. A timing generator 917 inputs the SYSCLK signal 914 thereto, and generates an ADCLK signal 916 and a CISCLK signal 915. The SYSCLK signal 914 is a system clock for determining an operation speed of the original read unit 100, and the ADCLK signal 916 is a sampling clock for determining a sampling rate of an A/D converter 908. The CISCLK signal 915 is used as a transfer clock of a CISSNS signal 918 corresponding to an output signal of a shift register 905.

Next, the original read operation is described. When the CISSTART signal 902 becomes active, the CIS section 901 starts to accumulate electric charges based on received light, and sets data sequentially in an output buffer 904. The timing generator 917 outputs the CISCLK signal 915 having, for example, a clock frequency of about 500 kHz to 1 MHz to the shift register 905. In synchronization with the input CISCLK signal 915, the shift register 905 outputs the data set in the output buffer 904 to the A/D converter 908 as the CISSNS signal 918. The CISSNS signal 918 has a predetermined data guarantee region, and hence the A/D converter 908 needs to sample the CISSNS signal 918 after a lapse of a predetermined time period from a timing of rise of the CISCLK signal 915 corresponding to the transfer clock. Further, the CISSNS signal 918 is output from the shift register 905 in synchronization with both a rising edge and a falling edge of the CISCLK signal 915 corresponding to the transfer clock. Therefore, the ADCLK signal 916 corresponding to the sampling clock of the CISSNS signal 918 is generated by the timing generator 917 so as to have a frequency which is twice as high as a frequency of the CISCLK signal 915. The CISSNS signal 918 is sampled at a rising edge of the ADCLK signal 916. The timing generator 917 performs frequency division on the input SYSCLK signal 914 corresponding to the system clock so as to generate the ADCLK signal 916 and the CISCLK signal 915 corresponding to the transfer clock. The phase of the ADCLK signal 916 is delayed by an amount corresponding to the above-mentioned data guarantee region as compared to the CISCLK signal 915 corresponding to the transfer clock.

The A/D converter 908 converts the CISSNS signal 918 into a digital signal, which is output to an output interface 909 as a CISSNS_D signal 919. The output interface 909 outputs the CISSNS_D signal 919 at a predetermined timing as the Sl_out signal 910 which is serial data. In this case, during a period from a rising edge of the CISSTART signal 902 corresponding to the start pulse to a timing corresponding to a predetermined number of pixels of the CISSNS_D signal 919, an analog output reference voltage is output, and the signal corresponding to this period cannot be used as effective pixels.

Further, a control circuit 911 controls an A/D conversion gain of the A/D converter 908 based on the Sl_in signal 912 and the Sl_select signal 913 input from the control CPU 801 via the ASIC 802. For example, when the contrast ratio of the image of the read original is not obtained, the control CPU 801 increases the contrast ratio by increasing the A/D conversion gain of the A/D converter 908. In this manner, the original may be read constantly at an optimum contrast ratio.

The description is herein given by using the configuration of the apparatus in which image information of all the pixels is output as the single CISSNS signal 918 corresponding to the output signal, but there may be employed a configuration for performing A/D conversion simultaneously on multiple divided areas of the pixels so as to attain a high-speed original read operation. Further, the description is given by way of the embodiment that employs the CIS for the original read unit 100, but as a matter of course, the CIS may be replaced with a CMOS sensor, a CCD sensor, or other sensors.

(Double-Sided Read Operation and Double-Sided Print Operation)

Next, processes of carrying out a double-sided read operation for an original and a double-sided print operation for a recording material are described. In the following description, the position at which the original read unit 100 faces the original-dedicated conveyance path 81 is referred to as "first read position", the position at which the original read unit 100 faces the double-sided conveyance path 80 is referred to as "second read position", and the position at which the original read unit 100 faces a white reference member 101 is referred to as "third read position". Note that, the third read position is a position between the first read position and the second read position.

Figure 3A:
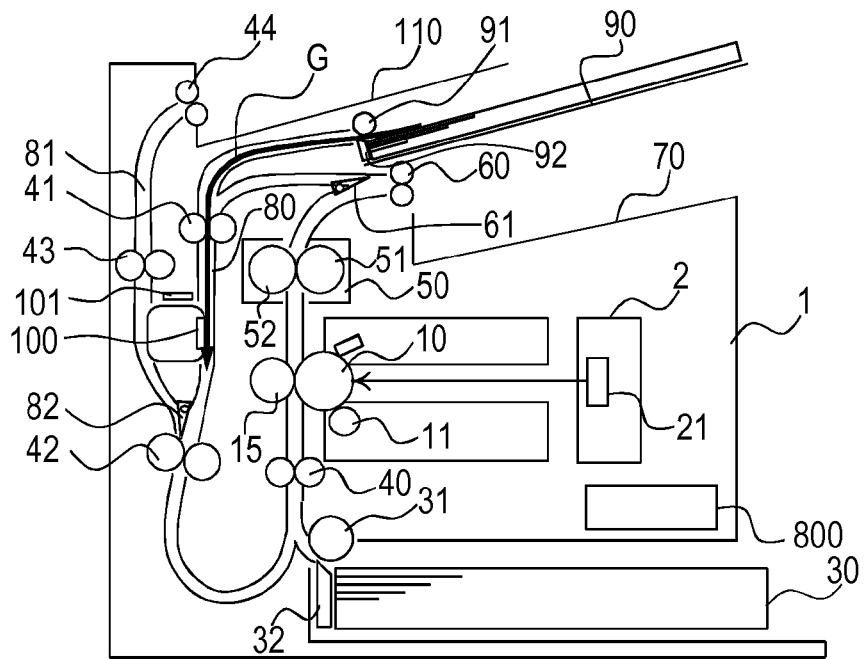
FIG. 3A is a diagram illustrating a state at the start of reading a front surface of an original in a double-sided read operation and a double-sided print operation according to the first embodiment.

FIG. 3A is an explanatory diagram illustrating a state at the start of reading a first surface corresponding to a front surface of the original G. The originals G received in a second sheet feeding unit 90 are conveyed one by one to the conveyance roller pair 41 by the original pickup roller 91 and a separation device 92. On the other hand, by the time before the start of reading the first surface corresponding to the front surface of the fed original G, the original read unit 100 corrects a white reference value based on results of light emission and reading of the white reference member 101 located at the third read position, and then rotates to the second read position facing the double-sided conveyance path 80. Note that, the original read unit 100 is configured to rotate about a predetermined position. The conveyance roller pair 41 conveys the original G to the original read unit 100. The original read unit 100 already stands by at the second read position facing the double-sided conveyance path 80, and information read by the original read unit 100 is stored in the image memory 804 as information on the first surface of the original G. Note that, the white reference member 101 is arranged to face downward for the purpose of preventing adhesion of dust. Further, a white reference plate is herein used as the reference member, but the color is not limited to white.

Figure 3B:
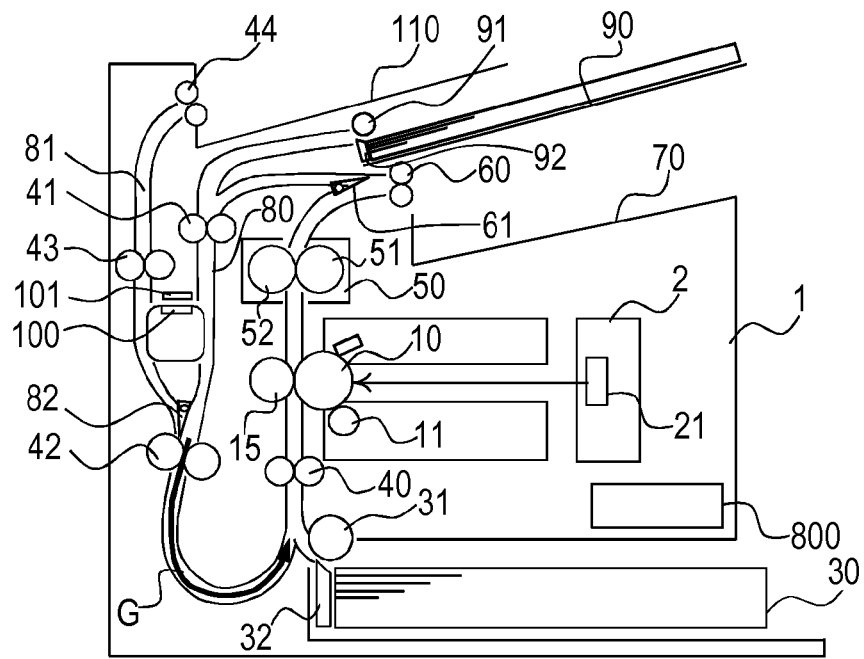
FIG. 3B is a diagram illustrating a state at the end of reading the front surface of the original in the double-sided read operation and the double-sided print operation according to the first embodiment.

FIG. 3B is an explanatory diagram illustrating a state at the end of reading the first surface corresponding to the front surface of the original G. The original G passing across the original read unit 100 is conveyed to the conveyance roller pair 42. The conveyance roller pair 42 stops its rotation at a time point when the trailing edge of the original G passes across the switchback flapper 82. Thus, the original G is stopped in a state of being nipped by the conveyance roller pair 42, and after a lapse of a predetermined time period, the original G is conveyed to the original-dedicated conveyance path 81.

Figure 3C:
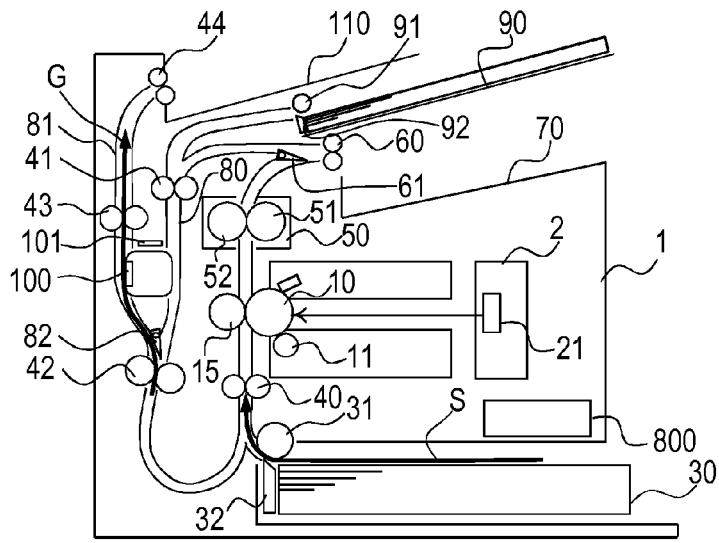
FIG. 3C is a diagram illustrating a state at the start of reading a back surface of the original in the double-sided read operation and the double-sided print operation according to the first embodiment.

FIG. 3C is an explanatory diagram illustrating a state at the start of reading a second surface corresponding to a back surface of the original G. At the same time when the switchback flapper 82 switches the conveyance path from the double-sided conveyance path 80 to the original-dedicated conveyance path 81, the original read unit 100 rotates to the first read position facing the original-dedicated conveyance path 81. Note that, the original read unit 100 in this case does not correct the white reference value, and hence the original read unit 100 passes across the third read position facing the white reference member 101 without stopping at the third read position. When the conveyance roller pair 42 rotates in the reverse direction, the original G is conveyed to the original read unit 100 along the original-dedicated conveyance path 81. When the original G is conveyed to and passes across the original read unit 100, information on the second surface corresponding to the back surface of the original G is stored in the image memory 804. The recording materials S fed from the first sheet feeding unit 30 are conveyed one by one to the conveyance roller pair 40. Substantially at the same time, based on the information on the second surface corresponding to the back surface of the original G that is stored in the image memory 804, the light emitting section 21 irradiates the photosensitive drum 10 with laser light to form an electrostatic latent image on the photosensitive drum 10. Subsequently, a toner image formed based on the electrostatic latent image is transferred onto the recording material S by the transfer roller 15, and then the recording material S is conveyed to the fixing unit 50 and the like. In this manner, the image forming operation based on the second surface of the original G is first completed. Note that, in FIG. 3C, the recording material S starts to be fed along with the start of reading the information on the second surface corresponding to the back surface of the original G, but the recording material S may be conveyed after reading the information on the second surface.

Figure 3D:
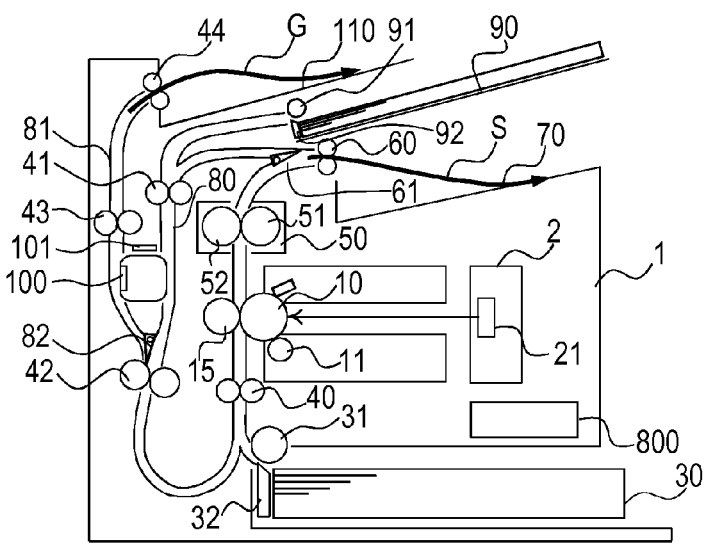
FIG. 3D is a diagram illustrating a state at the end of reading the back surface of the original in the double-sided read operation and the double-sided print operation according to the first embodiment.

FIG. 3D is an explanatory diagram illustrating a state at the end of reading the back surface of the original G. The original G that has undergone the original read operation is conveyed to the conveyance roller pair 43 and the conveyance roller pair 44, and is stacked on the second sheet discharging unit 110. When the trailing edge of the original G passes across the switchback flapper 82, the switchback flapper 82 switches the conveyance path from the original-dedicated conveyance path 81 to the double-sided conveyance path 80 so that the recording material S is conveyed toward the conveyance roller pair 40. Through the reverse rotation of the discharge roller pair 60, the recording material S that has undergone the image forming operation based on the second surface of the original G is conveyed toward the double-sided conveyance path 80 that is switched by the double-sided flapper 61.

Figure 3E:
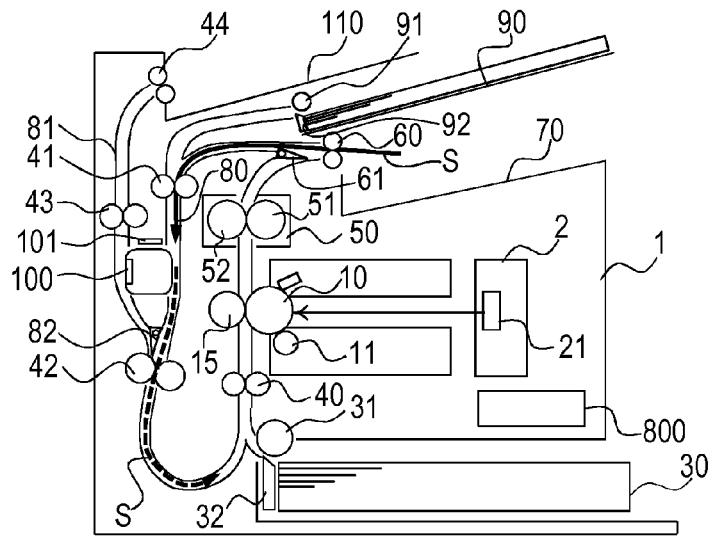
FIG. 3E is an explanatory diagram illustrating completion of an image forming operation for a back surface of a recording material in the double-sided read operation and the double-sided print operation according to the first embodiment.

FIG. 3E is an explanatory diagram illustrating completion of the image forming operation for the recording material S. The surface of the recording material S conveyed to the double-sided conveyance path 80 is reversed, and the recording material S passes across the original read unit 100 stopping at the first read position and is conveyed to the conveyance roller pair 40 via the conveyance roller pair 42. Accordingly, the recording material S is conveyed again toward the transfer roller 15 as indicated by the broken line of FIG. 3E. The image forming operation based on the second surface of the original G is already finished for the recording material S. Based on the above-mentioned image information on the first surface of the original G that is stored in the image memory 804, the image of the first surface of the original G is formed on the recording material S by the image forming unit including the optical unit 2, the photosensitive drum 10, the developing roller 11, the transfer roller 15, and the fixing unit 50. Then, the recording material S is stacked on the first sheet discharging unit 70.

(Single-Sided Read Operation and Single-Sided Print Operation)

Figure 4A:
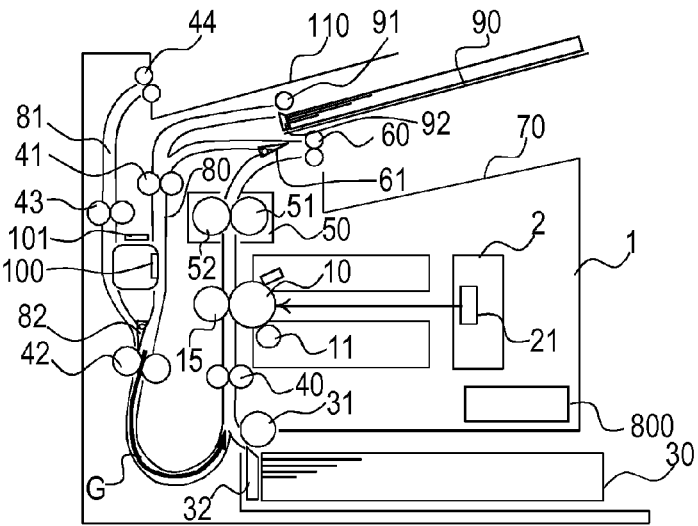
FIGS. 4A, 4B, and 4C are explanatory diagrams each illustrating a state in a single-sided read operation and a single-sided print operation according to the first embodiment.
Figure 4B:
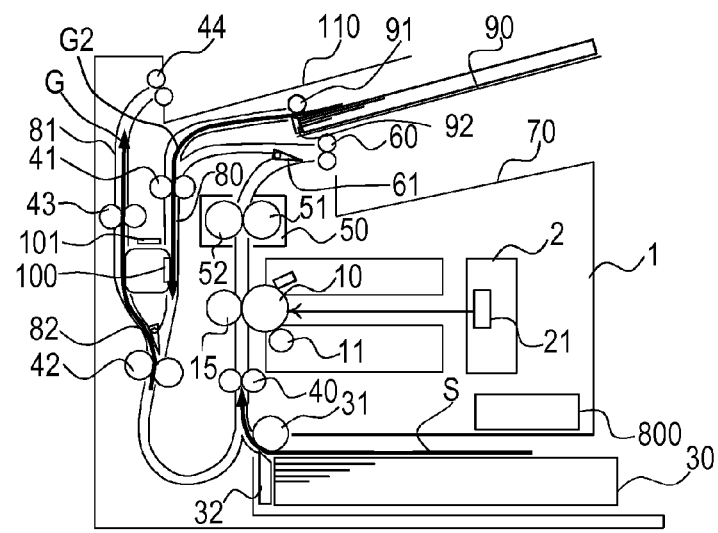
Figure 4C:
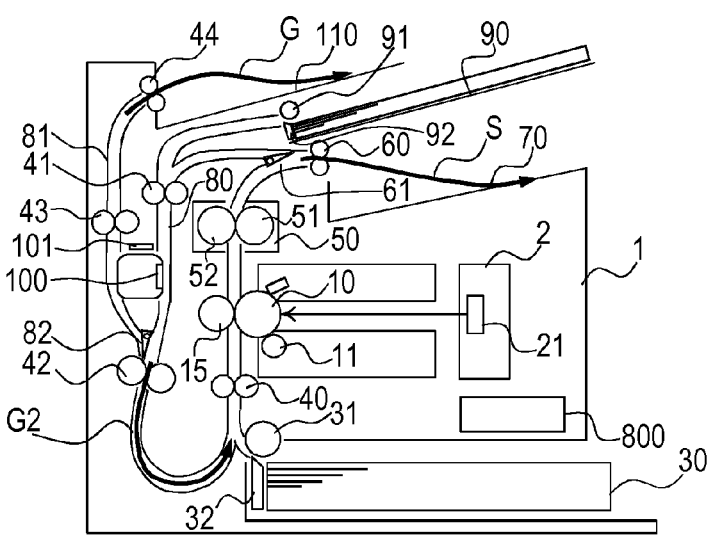

Next, referring to FIGS. 4A to 4C, processes of carrying out a single-sided read operation for the original G and a single-sided print operation for the recording material S are described. As compared to the processes of carrying out the double-sided read operation for the original G and the double-sided print operation for the recording material S, which are described above with reference to FIGS. 3A to 3E, the processes of carrying out the single-sided read operation for the original G and the single-sided print operation for the recording material S are different in that the original read unit 100 is fixed at the position facing the double-sided conveyance path 80. The state at the start of reading the first surface of the first original G is the same as the state illustrated in FIG. 3A, and description thereof is therefore omitted herein.

FIG. 4A is an explanatory diagram illustrating a state at the end of reading the first surface of the first original G. The original G passing across the original read unit 100 is conveyed to the conveyance roller pair 42. The conveyance roller pair 42 stops at a time point when the trailing edge of the original G passes across the switchback flapper 82. Thus, the original G is stopped in a state of being nipped by the conveyance roller pair 42. After a lapse of a predetermined time period, the original G is conveyed to the original-dedicated conveyance path 81. There is no need to read information on the second surface of the original G, and hence the original read unit 100 is not rotated to the position facing the original-dedicated conveyance path 81.

FIG. 4B is an explanatory diagram illustrating a state at the start of forming an image on the first recording material S. The recording materials S fed from the first sheet feeding unit 30 are conveyed one by one to the conveyance roller pair 40. Substantially at the same time, based on the information on the first surface of the original G that is stored in the image memory 804, the light emitting section 21 irradiates the photosensitive drum 10 with laser light to form an electrostatic latent image on the photosensitive drum 10. Subsequently, a toner image formed based on the electrostatic latent image is transferred onto the recording material S by the transfer roller 15, and then the recording material S is conveyed to the fixing unit 50 and the like. In this manner, the image forming operation for the first surface of the recording material S is completed. At the same time, a second original G2 starts to be conveyed. Information on the second original G2 that is read by the original read unit 100 is stored in the image memory 804 as information on the second original.

FIG. 4C is an explanatory diagram illustrating a state at the end of reading a first surface corresponding to a front surface of the second original G2. The first original G and the first recording material S are discharged onto the second sheet discharging unit 110 and the first sheet discharging unit 70, respectively. In a manner similar to the case of the original G, the second original G2 passing across the original read unit 100 is temporarily stopped and then switched back by the conveyance roller pair 42, and is conveyed to the conveyance roller pair 43 and the conveyance roller pair 44.

The process subsequently proceeds to discharge of the second original G2 and image formation for a second recording material S2 (not shown) based on the information on the first surface of the second original G2, but the operation is the same as that described above, and description thereof is therefore omitted herein.

The original read unit 100 is fixed at the second read position facing the double-sided conveyance path 80, and hence there is no need to rotate the original read unit 100 at the start of conveying the second original G2, with the result that the maximum throughput may be obtained.

(Flow Chart of Rotation Control for Original Read Unit)

Figure 5:
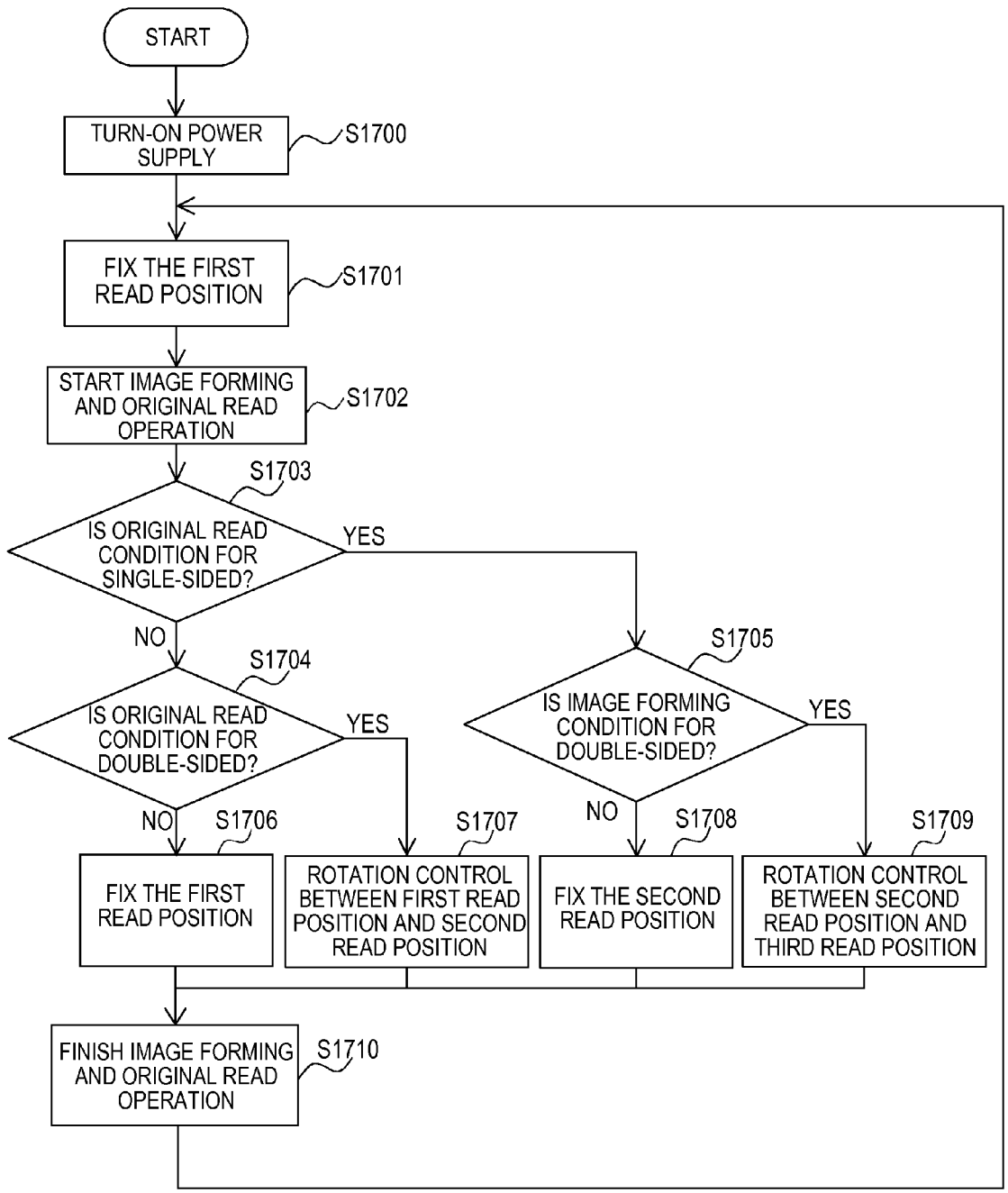
FIG. 5 is a flow chart illustrating control of a rotation direction of the original read unit according to the first embodiment.

Referring to FIG. 5, a method of rotation control for the original read unit 100, which is to be performed by the control CPU 801, is described. First, in Step (hereinafter referred to as "S") 1700, a power supply is turned ON. In S1701, the control CPU 801 controls the original read unit 100 to rotate to the first read position, and fixes the original read unit 100 at the first read position. This operation is described in a fifth embodiment of the present invention. In response to a command received from the host computer (not shown), in S1702, the control CPU 801 starts at least one of the image forming operation and the original read operation, and then in S1703, determines whether or not an original read condition is "for single-sided". Note that, the original read condition herein refers to a condition of whether to read only one of the front and back surfaces of the original G (for single-sided), to read both of the front and back surfaces of the original G (for double-sided), or to avoid reading the original G. When the control CPU 801 determines in S1703 that the original read condition is "for single-sided", in S1705, the control CPU 801 determines whether or not an image forming condition is "for double-sided". Note that, the image forming condition herein refers to a condition of whether to print an image on only one surface of the recording material S (for single-sided), to print images on both surfaces of the recording material S (for double-sided), or to avoid printing an image on the recording material S. When the control CPU 801 determines in S1705 that the image forming condition is "for double-sided", in S1709, the control CPU 801 controls the original read unit 100 to rotationally move between the second read position and the third read position. This control is described in a third embodiment of the present invention. After the control CPU 801 finishes the rotation control in S1709, in S1710, the control CPU 801 finishes the image forming operation and the original read operation.

When the control CPU 801 determines in S1705 that the image forming condition is not "for double-sided", that is, the image forming condition is "for single-sided" or "no image forming operation", in S1708, the control CPU 801 controls the original read unit 100 to rotate to the second read position, and fixes the original read unit 100 at the second read position. The case where the original read condition is "for single-sided" and the image forming condition is "for single-sided" is described above. After the control CPU 801 fixes the original read unit 100 in S1708, in S1710, the control CPU 801 finishes the image forming operation and the original read operation. When the control CPU 801 determines in S1703 that the original read condition is not "for single-sided", in S1704, the control CPU 801 further determines whether or not the original read condition is "for double-sided". When the control CPU 801 determines that the original read condition is "for double-sided", in S1707, the control CPU 801 controls the original read unit 100 to rotate between the first read position and the second read position without stopping the original read unit 100 at the third read position. This operation is described above. After the control CPU 801 finishes the rotation control in S1707, in S1710, the control CPU 801 finishes the image forming operation and the original read operation. Note that, an operation to be performed in a case of correcting the white reference value using the white reference member 101 during the rotation control for the original read unit 100 between the first read position and the second read position is described in the third embodiment.

Finally, when the control CPU 801 determines in S1704 that the original read condition is not "for double-sided", that is, "no original read operation", in S1706, the control CPU 801 controls the original read unit 100 to rotate to the first read position, and fixes the original read unit 100 at first read position. This operation is described in a second embodiment of the present invention. After the control CPU 801 fixes the original read unit 100 at the first read position in S1706, in S1710, the control CPU 801 finishes the image forming operation and the original read operation. After the control CPU 801 finishes the image forming operation and the original read operation in S1710, the control CPU 801 returns to the processing in S1701.

As described above, the control method for the rotation direction of the original read unit 100 is changed depending on the image forming condition and the original read condition, and thus the maximum throughput may be obtained under those conditions.

According to this embodiment, the productivity may be improved in the case where printing the image of the original that has undergone the read operation, and stable print performance may be obtained.

Second Embodiment

In the second embodiment, the basic configuration of the image forming apparatus is the same as that in the first embodiment except for the control of the rotation direction of the original read unit 100, such as the processing in S1706 of FIG. 5. The same applies to the embodiments to be described later. This embodiment is directed to a case where the original read operation of the original read unit is not performed and the double-sided print operation is performed on the recording material.

(Double-Sided Print Operation without Original Read Operation)

Figure 6:
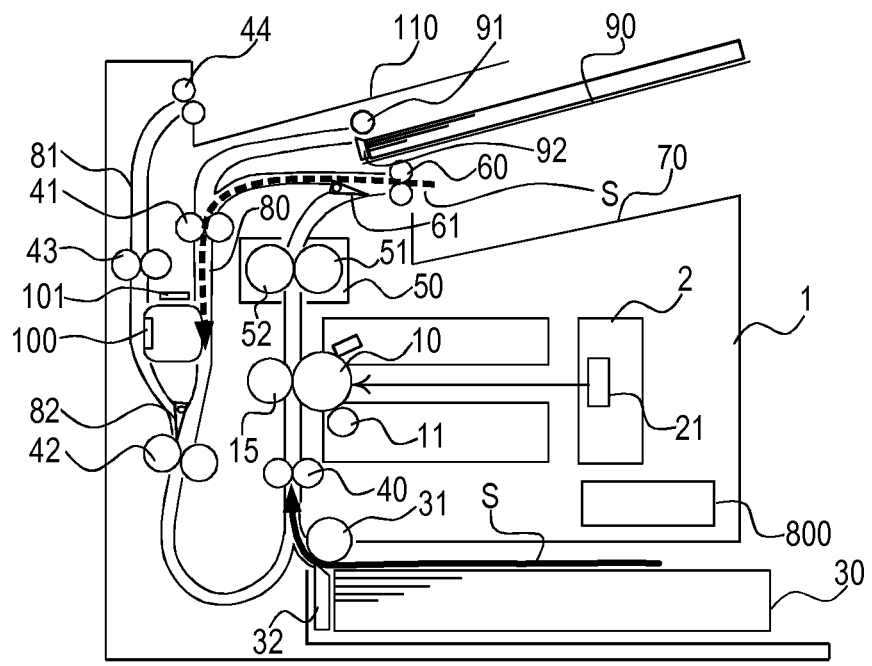
FIG. 6 is an explanatory diagram illustrating rotation control for the original read unit at the time of forming an image according to a second embodiment of the present invention.

Referring to FIG. 6, control of the rotation direction of the original read unit 100 in the case of performing only the image forming operation without using the original read unit 100 is described. In response to a double-sided print command received from the host computer (not shown), the recording material S is first conveyed to the transfer roller 15 by the conveyance roller pair 40. Then, a toner image is transferred and fixed to the recording material S, and the recording material S reaches the discharge roller pair 60. The double-sided flapper 61 switches the conveyance path after the passage of the trailing edge of the recording material S. After that, the discharge roller pair 60 rotates in a reverse direction to convey the recording material S to the double-sided conveyance path 80. The recording material S thus switched back is conveyed to the side of the original read unit 100 via the conveyance roller pair 41. The image information on the recording material S is not acquired, and hence the original read unit 100 is fixed to the first read position facing the original-dedicated conveyance path 81. After that, the recording material S is conveyed to the conveyance roller pair 42 and the conveyance roller pair 40, and conveyed again to the transfer roller 15. Then, a toner image is transferred and fixed to the second surface of the recording material S, and the recording material S is stacked on the first sheet discharging unit 70.

In general, paper dust generated from the recording material S under conveyance is present in the conveyance path of the image forming apparatus 1. Further, for example, toner which is transferred onto the recording material S but cannot be fixed thereto is present in the conveyance path. When those dust and blot adhere to the original read unit 100, the information on the original G cannot be read in this portion, which leads to a risk of failure in the original read operation. As in this embodiment, the original read unit 100 is caused to face the conveyance path other than the conveyance path in use, and thus the adhesion of the dust and blot to the surface of the original read unit 100 may be prevented. In this case, the original read unit 100 is caused to face the original-dedicated conveyance path 81, but may be located at any position other than the position facing the double-sided conveyance path 80.

As described above, the original read unit 100 in the case of performing only the image forming operation without using the original read unit 100 is prevented from facing the double-sided conveyance path 80 in which the recording material S is being conveyed, and thus the risk of adhesion of the dust and blot may be reduced.

According to this embodiment, the productivity may be improved in the case where printing the image of the original that has undergone the read operation, and stable print performance may be obtained.

Third Embodiment

The third embodiment is directed to a case where the single-sided read operation is performed on the originals and the double-sided print operation is performed on the recording material.

(Single-Sided Read Operation and Double-Sided Print Operation)

Figure 7A:
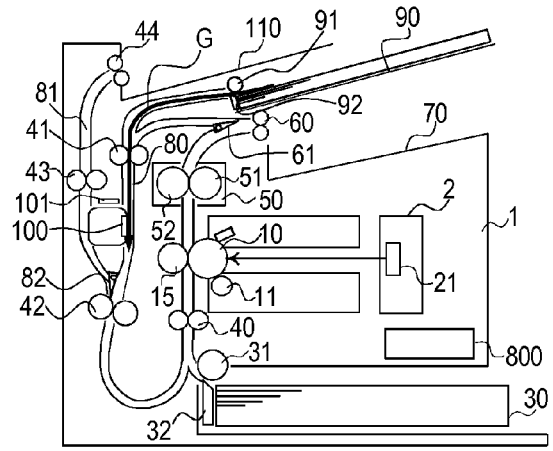
FIGS. 7A, 7B, 7C, and 7D are explanatory diagrams each illustrating a state in the single-sided read operation for originals and the double-sided print operation according to a third embodiment of the present invention.
Figure 7B:
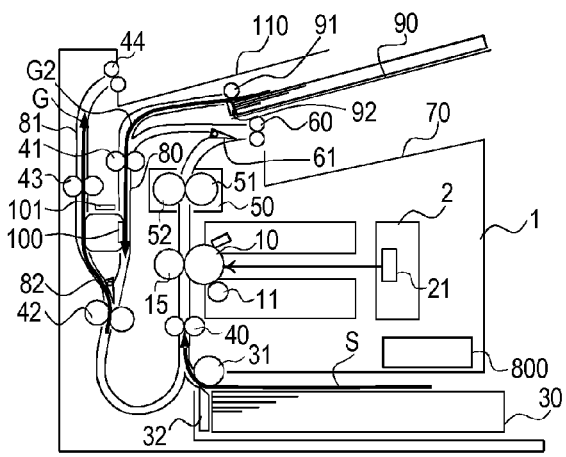
Figure 7C:
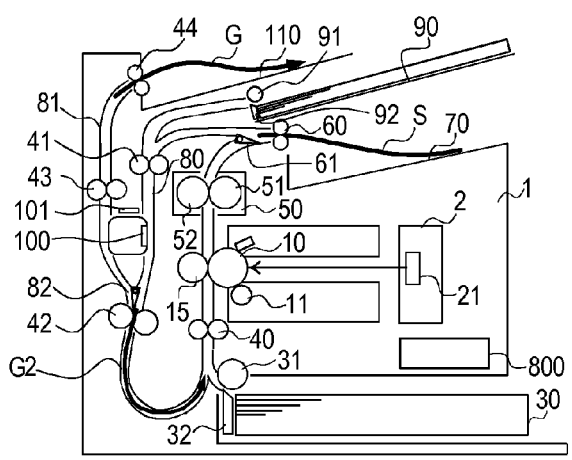

FIG. 7A illustrates a state in which the information on the first surface of the original G is acquired as in the processing in S1709 of FIG. 5. In this case, the original read unit 100 is located at the second read position facing the double-sided conveyance path 80. Subsequently, as illustrated in FIG. 7B, the original G is switched back through use of the conveyance roller pair 42, and is conveyed to the conveyance roller pair 43 and the conveyance roller pair 44. At the same time, the recording material S and the second original G2 start to be conveyed through use of the CST pickup roller 31 and the original pickup roller 91, respectively. As illustrated in FIG. 7C, during a period in which the read operation for the second original G2 is completed and the second original G2 stands by for the switchback operation of the conveyance roller pair 42, the recording material S reaches the discharge roller pair 60, and also comes into a state in which the switchback operation may be performed. During a period in which the second original G2 is conveyed along the original-dedicated conveyance path 81 through use of the conveyance roller pair 42, the conveyance roller pair 43, and the conveyance roller pair 44, the recording material S is also conveyed again to the image forming unit via the double-sided conveyance path 80. There is no need to acquire the information on the recording material S, and hence the original read unit 100 is not necessarily located at the position facing the double-sided conveyance path 80, that is, the second read position.

Figure 7D:
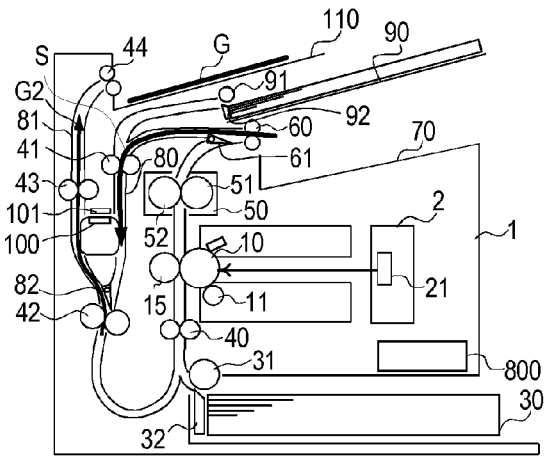
Figure 8:
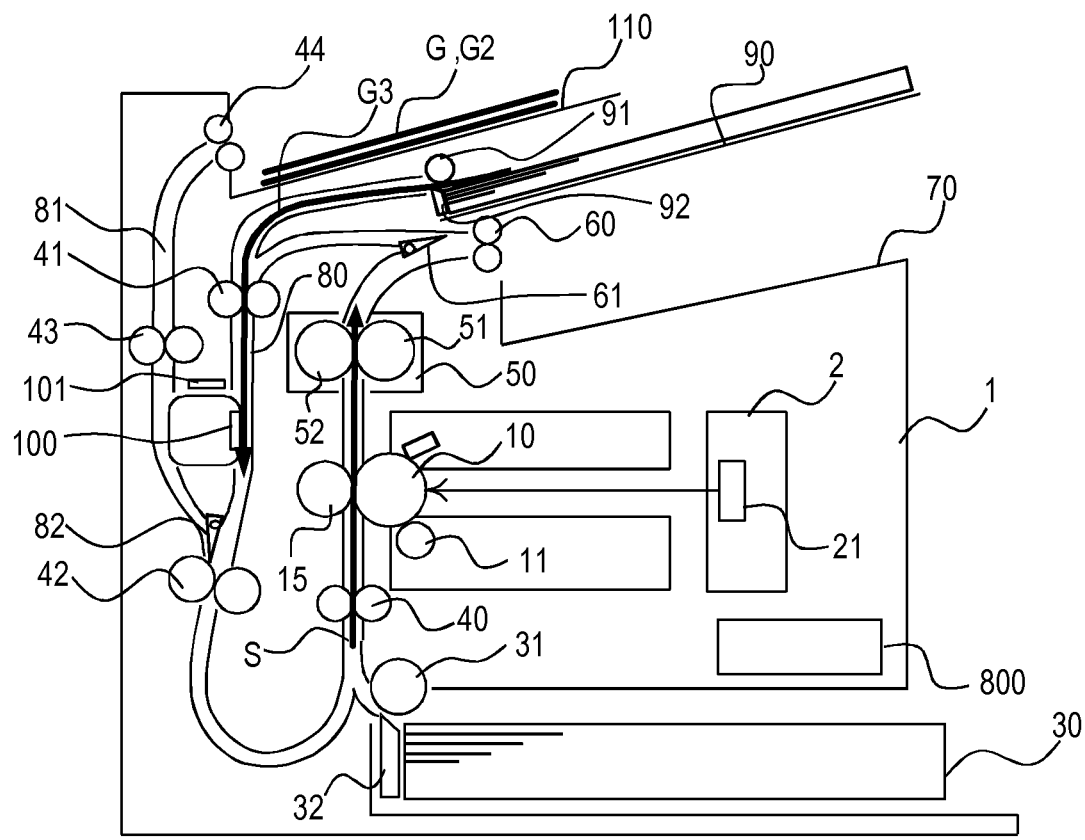
FIG. 8 is an explanatory diagram illustrating a state at the start of reading a front surface of a third original according to the third embodiment.

In this embodiment, when the read operation for the first surface of the second original G2 is finished and the recording material S is switched back for printing an image on the second surface thereof as illustrated in FIG. 7D, the original read unit 100 is controlled to rotate to the third read position facing the white reference member 101. At the third read position, light is emitted to the white reference member 101 and the white reference value is corrected. Then, as illustrated in FIG. 8, by the time before the start of reading a third original G3 subsequently, the original read unit 100 is rotated to the second read position facing the double-sided conveyance path 80. As compared to the processes of carrying out the single-sided read operation for the information on the original G and the single-sided print operation for the recording material S according to the first embodiment, the recording material S immediately after the fixing operation passes in the vicinity of the original read unit 100. Therefore, the ambient temperature of the original read unit 100 rises, leading to a risk of fluctuation in light receiving sensitivity of the CIS section 901 and decrease in light intensity of the light emitting element 907. To eliminate the risk, the white reference value is corrected at the timing when the original read unit 100 is not in use, and thus the performance of the original read unit 100 may be calibrated.

As described above, when the information on one surface of the original is acquired through use of the original read unit and images of the information are formed on both surfaces of the recording material, the white reference value is corrected during the original read operation and the image forming operation, and thus an image forming apparatus having stable performance may be provided.

According to this embodiment, the productivity may be improved in the case where printing the image of the original that has undergone the read operation, and stable print performance may be obtained.

Fourth Embodiment

In a fourth embodiment of the present invention, similarly to the first embodiment, the processes of carrying out the double-sided read operation for information on an original and the double-sided print operation for a recording material are executed. After the original G passes across the original read unit 100, the original read unit 100 is rotated from the second read position facing the double-sided conveyance path 80 to the first read position facing the original-dedicated conveyance path 81. At this time, as illustrated in FIG. 3B, the original read unit 100 passes across the third read position facing the white reference member 101. This embodiment is different from the first embodiment in that the original read unit 100 is temporarily stopped at the third read position facing the white reference member 101. At the third read position, light is emitted to the white reference member 101 and the white reference value is corrected. Thus, similarly to the third embodiment, the performance of the original read unit 100 may be calibrated.

As described above, when the information on both surfaces of the original is acquired through use of the original read unit 100 and images of the information are formed on both surfaces of the recording material, the white reference value is corrected during the original read operation and the image forming operation, and thus an image forming apparatus having stable performance may be provided.

According to this embodiment, the productivity may be improved in the case where printing the image of the original that has undergone the read operation, and stable print performance may be obtained.

Fifth Embodiment

Figure 9:
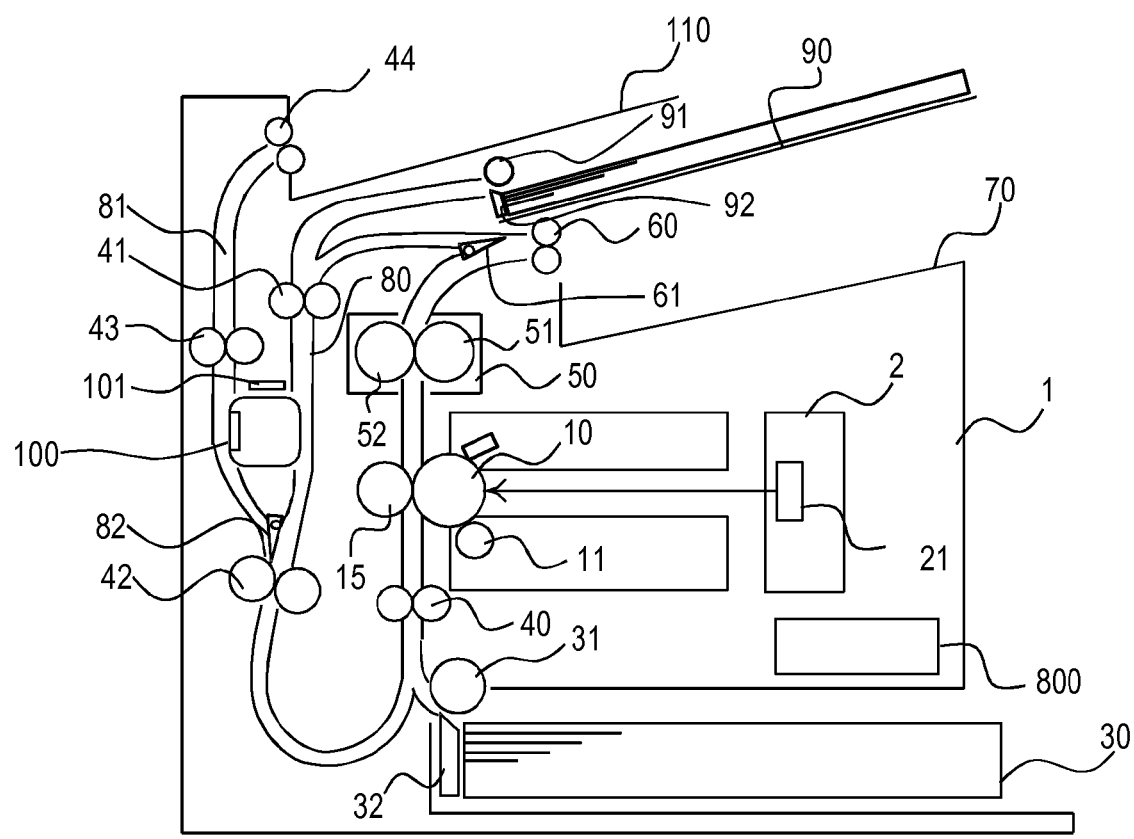
FIG. 9 is an explanatory diagram illustrating a position of the original read unit in a standby state according to a fifth embodiment of the present invention.

In the fifth embodiment, unlike the first embodiment, the read operation for the original G and the print operation for the recording material S are not carried out. For example, the fifth embodiment corresponds to the case of performing the processing in S1701 of FIG. 5. The fifth embodiment has a feature in that, as illustrated in FIG. 9, the original read unit 100 is rotated to and fixed at the first read position that is farthest from the fixing unit 50. In other words, the original read unit 100 is fixed at the read position other than the second read position.

In the above-mentioned fixing unit 50 of the image forming apparatus 1, the heating roller 51 may be heated to about 80° C. even in a standby state in which the print operation for the recording material is not performed. This is because, in the process of fixing the toner image, the temperature of the heating roller 51 needs to be raised to about 170° C. and therefore the time period required to raise the temperature enough to perform printing is shortened after receiving a print command from the host computer. Therefore, the fixing unit 50 is heated even when the printing is not executed, and the original read unit 100 provided in the vicinity of the fixing unit 50 is also heated to some degree. As described in the third embodiment, the read performance of the original read unit 100 has temperature characteristics. In this embodiment, the effect of the temperature is minimized, and thus the performance of the original read unit 100 may be stabilized in the so-called standby state in which the read operation for the original and the print operation for the recording material are not carried out.

As described above, when the original read unit and the image forming unit are not in use, the original read unit is controlled to rotate away from the fixing unit 50, and thus the temperature rise of the original read unit 100 is suppressed. As a result, an image forming apparatus having stable performance may be provided.

According to this embodiment, the productivity may be improved in the case where printing the image of the original that has undergone the read operation, and stable print performance may be obtained.

Note that, the embodiments are described above assuming the configuration of the image forming apparatus for forming a monochrome image, but the present invention is also applicable to a color image forming apparatus. As the color image forming apparatus to which the present invention is applicable, there is a color image forming apparatus of the type in which photosensitive drums serving as image bearing members for forming yellow, magenta, cyan, and black images are arranged in line and the images are transferred from the respective photosensitive drums onto a recording material or an intermediate transfer member. The present invention is also applicable to a color image forming apparatus of the type in which images of the respective colors are sequentially formed on a single image bearing member (photosensitive drum) so that a color image is formed on an intermediate transfer member and transferred onto a recording material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106110, filed May 7, 2012, which is hereby incorporated by reference herein in its entirety.

What is claimed is:

1. An image forming apparatus, comprising:
   an image forming unit configured to form an image on a recording material;
   a first conveyance path in which the recording material is conveyed to form the image on the recording material;
   a second conveyance path in which the recording material is conveyed in order to convey the recording material to the first conveyance path again, wherein a recording material and an original are to be conveyed selectively in the second conveyance path;
   a third conveyance path in which only the original is conveyed,
   a read unit configured to read an original conveyed in the second conveyance path, at a first read position facing the second conveyance path and to read the original conveyed in the third conveyance path, at a second read position facing the third conveyance path; and
   a control unit configured to switch the read position of the read unit either at the first read position or the second read position based on a read condition of the read unit and an image forming condition of the image forming unit;
   a reference member, wherein the control unit switches the read position to a third read position between the first read position and the second read position, and performs a calibration operation of the original read unit based on a result of reading the reference member by the original read unit at a third read position,
   wherein in a case where the original read unit reads the first surface of the original at the first position and the second surface of an original at the second position and the image forming unit forms an image on both surfaces of the recording material, the control unit controls the read unit to rotationally move to the third read position during the recording material passes along the second conveyance path, and performs the control for correcting the read unit based on the result of reading the reference member by the original read unit.

2. An image forming apparatus according to claim 1, wherein in a case where both first and second surfaces of an original are to be read, the controller switches an orientation of the read unit so that the read unit reads a first surface of the original at the first read position and reads a second surface of the original at the second position after the read unit read the first surface of the original.

3. An image forming apparatus according to claim 1, wherein the original read unit is capable of switching the read position between the first read position and the second read position by rotating about a predetermined position.

4. An image forming apparatus according to claim 1, further comprising a reference member,
   wherein the control unit switches the read position to a third read position between the first read position and the second read position, and performs a calibration operation of the read unit based on a result of reading the reference member by the original read unit,
   wherein in a case where the read unit reads both the first surface and the second surface of an original, the control unit performs the calibration operation based on the result of reading the reference member at the third read position when the original read unit rotates to one of the first read position and the second read position.

5. An image forming apparatus according to claim 4, wherein the reference member includes a white reference member.

6. An image forming apparatus according to claim 4, wherein the read unit is capable of switching the read position among the first read position, the second read position and the third read position by rotating the rotation about the predetermined position.

7. An image forming apparatus according to claim 4, wherein the image forming unit comprises a fixing unit for fixing an image formed on a recording material, and wherein in a case where the read unit does not read an original and the image forming unit does not form an image on the recording material, the control unit controls the read unit to rotationally move to a farthest read position from the fixing unit among the first read position, the second read position, and the third read position.

8. An image forming apparatus according to claim 1, wherein in a case where the read unit does not read an original and the image forming unit does not form an image on the recording material, the control unit controls the original read unit to rotationally move to the third read position.

9. An image forming apparatus according to claim 1, wherein the read unit reads an image of an original, and the image forming unit forms the image read by the read unit, on the recording material.

10. An image forming apparatus according to claim 1, wherein the reference member includes a white reference member.

11. An image forming apparatus according to claim 1, wherein the read unit is capable of switching the read position among the first read position, the second read position and the third read position by rotating the original read unit about the predetermined position.

12. An image forming apparatus according to claim 1, wherein the image forming unit comprises a fixing unit for fixing an image formed on a recording material, and wherein in a case where the read unit does not read an original and the image forming unit does not form an image on the recording material, the control unit controls the read unit to rotationally move to a farthest read position from the fixing unit among the first read position, the second read position, and the third read position.

* * * * *